United States Patent
Klots et al.

(10) Patent No.: US 8,631,394 B2
(45) Date of Patent: Jan. 14, 2014

(54) STATIC RESOURCE PROCESSING

(75) Inventors: Levy Klots, Belmont, CA (US); Andrey Sukhachev, Mountain View, CA (US); Xiaoliang Wei, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 325 days.

(21) Appl. No.: 13/006,380

(22) Filed: Jan. 13, 2011

(65) Prior Publication Data

US 2012/0185835 A1   Jul. 19, 2012

(51) Int. Cl.
   *G06F 9/45* (2006.01)
(52) U.S. Cl.
   USPC ......................................................... 717/152
(58) Field of Classification Search
   None
   See application file for complete search history.

(56) References Cited

U.S. PATENT DOCUMENTS

| | | | |
|---|---|---|---|
| 6,668,354 B1* | 12/2003 | Chen et al. | 715/255 |
| 7,231,632 B2* | 6/2007 | Harper | 717/109 |
| 2003/0110297 A1* | 6/2003 | Tabatabai et al. | 709/246 |

\* cited by examiner

*Primary Examiner* — Don Wong
*Assistant Examiner* — Deric Ortiz
(74) *Attorney, Agent, or Firm* — Baker Botts L.L.P.

(57) ABSTRACT

One embodiment constructs a graph comprising one or more parameter nodes and one or more transformation nodes, wherein: each parameter node represents one or more parameters; and each transformation node represents one or more transformations; and sequentially applies from a lowest level to a highest level of the graph, the one or more parameters represented by each parameter node and the one or more transformations represented by each transformation node to a static resource to determine one or more versions of the static resource.

20 Claims, 6 Drawing Sheets

STATIC RESOURCE PROCESSING

TECHNICAL FIELD

The present disclosure generally relates to processing Internet resources and more specifically relates to processing static resources used by or included in web pages.

BACKGROUND

There are two types of Internet content that may be included in a web page: static content and dynamic content. In general, dynamic content may change (i.e., may be updated) frequently, whereas static content tend to remain relatively stable and unchanged. Internet content may also be referred to as Internet resources; thus, there may be static resources and dynamic resources used to construct a web page. Examples of static resources may include, but not limited to, JavaScript code for generating dynamic web pages, Cascading Style Sheets (CSS) code that describes the presentation semantics of web pages, and images (e.g., GIF or JPEG files) included in web pages.

SUMMARY

The present disclosure generally relates to processing Internet resources and more specifically relates to processing static resources used by or included in web pages.

Particular embodiments construct a graph comprising one or more parameter nodes and one or more transformation nodes, wherein: each parameter node represents one or more parameters; and each transformation node represents one or more transformations; and sequentially apply from a lowest level to a highest level of the graph, the one or more parameters represented by each parameter node and the one or more transformations represented by each transformation node to a static resource to determine one or more versions of the static resource.

These and other features, aspects, and advantages of the disclosure are described in more detail below in the detailed description and in conjunction with the following figures.

DESCRIPTION OF EXAMPLE EMBODIMENTS

Figure 1:
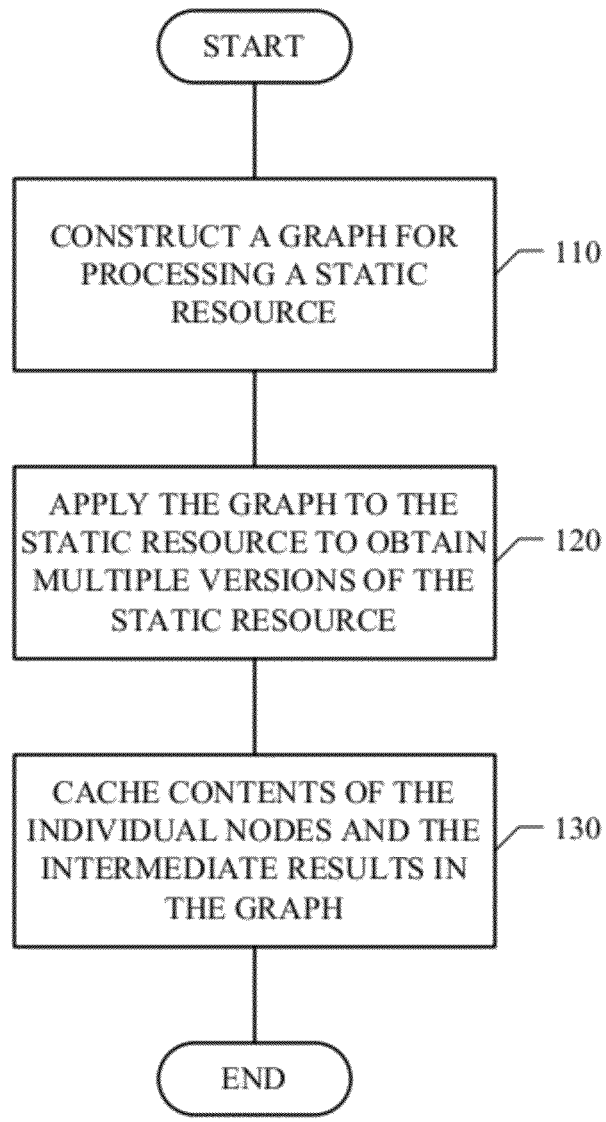
FIG. 1 illustrates an example method for processing static resources.

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A web page may include static resources and/or dynamic resources. Examples of static resources may include, without limitation, JavaScript code, CSS code, and images. Although that in general, the static resources tend to remain unchanged (i.e., static) over some periods of time, a single static resource may have many different versions or variations suitable for use under different circumstances. For example, a web page may have associated CSS that describes how the contents included in the web page are to be presented in terms of format, look and feel, etc. However, there may be multiple versions of the CSS for a specific web page, where different versions may be suitable for different circumstances. One version may be suitable for use with the web page when the web page is displayed in Microsoft Internet Explorer, while another version may be suitable for use with the web page when the web page is displayed in Mozilla Firefox, and a third version may be suitable for use with the web page when the web page is displayed in a mobile browser running on a smart telephone (e.g., an iPhone or a Blackberry) or a tablet computer. As another example, a web page may include an image. Similarly, there may be multiple versions of the same image, such as one version with a higher resolution for use with the web page when the web page is displayed in a browser running on a computer connected to a high-resolution monitor, while another version with a lower resolution for use with the web page when the web page is displayed in a browser running on a smart telephone with a small, low-resolution screen. As a third example, JavaScript code may be used to generate dynamic web pages for different users. Again, there may be multiple versions of the same code for generating the textual contents of a web page in different languages (e.g., English, French, Italian, etc.) so that an appropriate version of the JavaScript code is used to generate the web page with the suitable language for each specific user.

In particular embodiments, it may be preferable to obtain many, if not all, different versions of a static resource before that static resource is used in practical applications. This way, the individual versions of the static resource are readily available whenever they are needed, without having to obtain a specific version of the static resource at the time that version is actually needed and thus resulting in delays. Thus, particular embodiments may obtain various, especially frequently-used, versions of each static resource and store the versions of the static resources in a database (e.g., a static-resource database). To further improve performance, particular embodiments may cache some or all of the different versions of the static resources so that they may be accessed quickly.

In practice, for example, a web application may utilize a large number (e.g., hundreds or thousands) of static resources, and each static resource may have many versions. Thus, it is impractical to manually construct the individual versions of each static resource. Instead, particular embodiments may define and construct one or more graphs, and then apply a suitable graph to each static resource to automatically construct the different versions of that static resource. In particular embodiments, a different graph may be defined and constructed for each type of static resources available. For example, there may be one graph defined and constructed for all JavaScript code, another graph defined and constructed for all images, and a third graph defined and constructed for all CSS code. Of course, the static resources may be grouped according to different levels of granularity (e.g., based on the specific requirements of a practical application), and a different graph may be defined and constructed for each group of static resources. Once these graphs have been constructed, in particular embodiments, a graph may be selected for and applied to each static resource based on the type of the static resource or the group to which the static resource belongs to construct the different versions of the static resource.

FIG. 1 illustrates an example method for processing a static resource using a graph. Note that although the steps of FIG. 1 may be described with respect to a single static resource and a single graph, these steps may be similarly applied to many static resources and many graphs.

Figure 2:
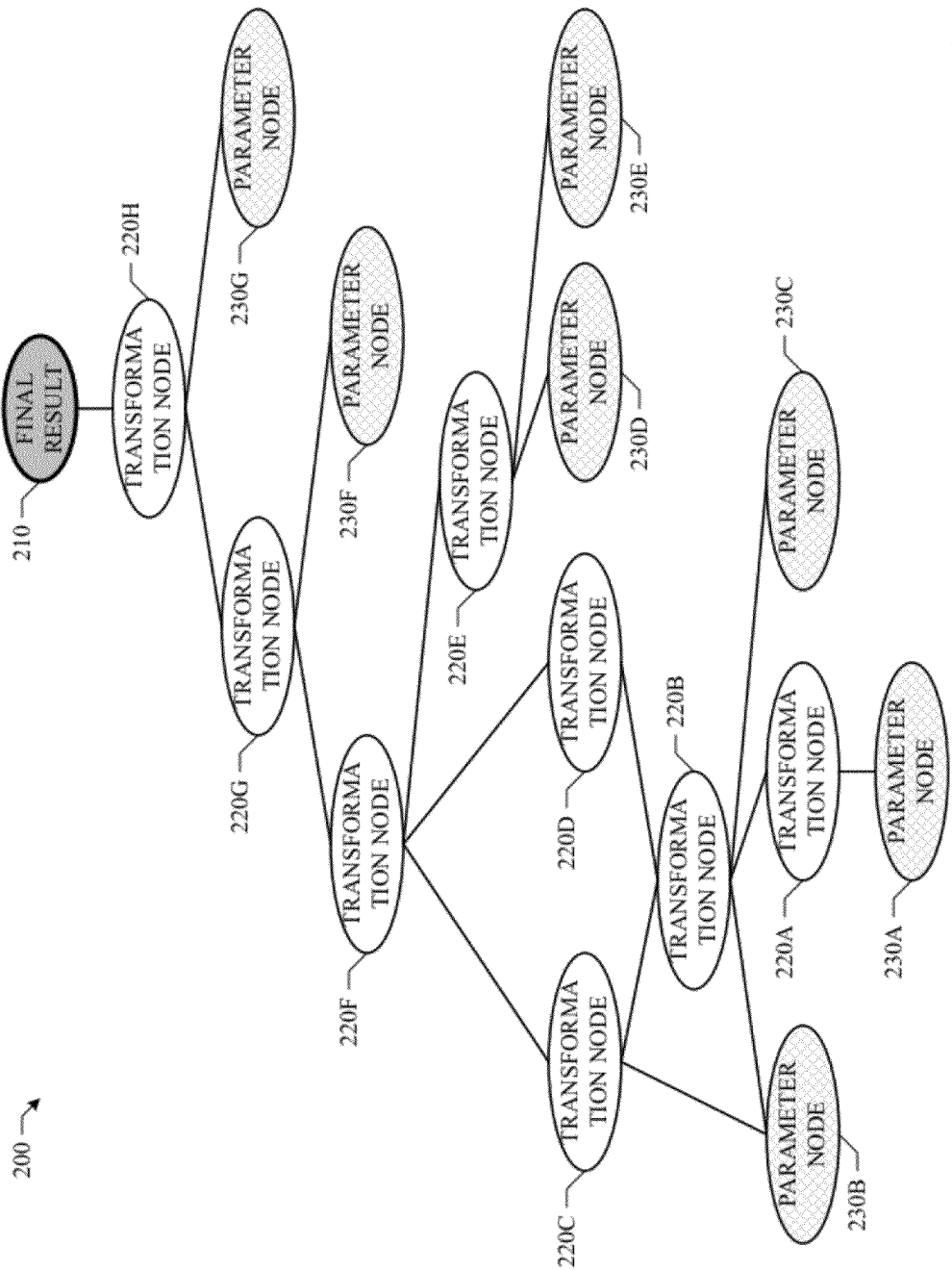
FIG. 2 illustrates an example graph that may be applied to static resources.

Particular embodiments may define and construct a graph for processing a static resource or a group of static resources, as illustrated in STEP 110. In particular embodiments, the graph may include a final-result node, one or more transformation nodes, and one or more parameter nodes. FIG. 2 illustrates an example of such a graph 200, which includes a final-result node 210, a number of transformation nodes 220, and a number of parameter nodes 230. Note that a graph may include any number of parameter nodes and transformation nodes.

In particular embodiments, the final-result node is the root node of the graph and represents all the different versions of a static resource finally obtained after the static resource has been processed along the graph. In particular embodiments, each parameter node is a leaf node of the graph and represents one or more parameters that may be applied to the static resource when the static resource is processed along the graph. In particular embodiments, each transformation node is an intermediate node of the graph and represents one or more transformations that may be applied to the static resource when the static resource is processed along the graph. In particular embodiments, each transformation may incorporate one or more specific parameters (e.g., as input) and result in one or more intermediate versions of the static resource (described in more detail below). Note that the parameters represented by one parameter node may differ from the parameters represented by another parameter node. Similarly, the transformations represented by one transformation node may differ from the transformations represented by another transformation node.

For example, with graph 200 illustrated in FIG. 2, each transformation node 220 may represent one or more transformations, and each parameter node 230 may represent one or more parameters. Transformation nodes 220 are intermediate nodes, and parameter nodes 230 are leaf nodes.

In particular embodiments, the nodes of the graph may be arranged in a hierarchy forming a number of levels. The first level has the final-result node (i.e., the root node), and each subsequent level may have one or more transformation nodes and/or one or more parameter nodes. Each parameter node may have one or more parent nodes and/or one or more child nodes. Each transformation node may have one or more child nodes and/or one or more parent nodes. In particular embodiments, for each parameter node, its child nodes may be other parameters nodes, and its parent nodes may be either transformation nodes or other parameter nodes. In particular embodiments, for each transformation node, its child nodes may be either parameter nodes or other transformation nodes, and its parent nodes may be either other transformation nodes or the final-result node.

In particular embodiments, a graph, such as the one illustrated in FIG. 2, may be defined and constructed for each type or each group of static resources. Of course, one graph may differ from another graph in terms of the number and types of nodes each graph has. In particular embodiments, for a particular graph, how many transformation and parameter nodes are included in the graph, how these nodes are arranged, how many levels the nodes form, which specific parameters each parameter node represents, and which specific transformation each transformation represents all depend on the specific requirements of an application. In particular embodiments, each graph used to process a group of static resources may be defined and constructed by human users. The present disclosure contemplates any suitable graph that may be applied to static resources.

In particular embodiments, once a graph (e.g., graph 200) has been constructed, it may be applied to a static resource to obtain the different versions of that static resource. Again, in particular embodiments, given a specific static resource, the graph applied to the static resource may be selected based on the type of the static resource. For example, if the static resource is JavaScript code, then the graph constructed for JavaScript code may be applied to this static resource. On the other hand, if the static resource is an image, then the graph constructed for images may be applied to this static resource.

In particular embodiments, the individual nodes in the graph may be applied to the static resource in order, from the lowest level of the graph to the highest level of the graph. In particular embodiments, at each level of the graph, the transformation nodes at that level are individually analyzed and processed. In particular embodiments, performing the transformations represented by a specific transformation node may result in one or more intermediate versions of the static result. Consequently, for each transformation node at each level of the graph, if the transformation node has only parameter nodes as its child nodes, the transformations represented by the transformation node are applied to the static resource with the parameters represented by its child parameter nodes as input parameters to obtain further intermediate versions of the static resource. If the transformation node has only transformation nodes as its child nodes, the transformations represented by the transformation node are applied to the intermediate versions of the static resource resulted from applying the transformations represented by its child transformation nodes to obtain further intermediate versions of the static resource. If the transformation node has both parameter nodes and transformation nodes as its child nodes, the transformations represented by the transformation node are applied to the intermediate versions of the static resource resulted from applying the transformations represented by its child transformation nodes with the parameters represented by its child parameter nodes as input parameters to obtain the intermediate versions of the static resource, For example, suppose graph 200 illustrated in FIG. 200 is applied to a static resource. Graph 200 has nine levels, and there are one or more transformation nodes 220 at each level between levels 2 and 7. There are a number of paths from parameter nodes 230 (i.e., leaf nodes) to final-result node 210 (i.e., root node). Along each path, the static resources is processed in sequential order, from the nodes at the lowest level to final-result node 210 at the highest level.

With respect to transformation node 220A, it has one child parameter node 230A but no child transformation node. The transformations represented by transformation node 220A may be applied to the static resource with the parameters represented by its child parameter node 230A as input parameters to obtain a number of intermediate versions of the static resource. In particular embodiments, these specific intermediate versions of the static resource result from processing transformation node 220A and may be considered as being associated with transformation node 220A.

With respect to transformation node 220B, which is at a level immediately above transformation node 220A, it has two child parameter nodes 230B and 230C and one child transformation node 220A. The transformations represented by transformation node 230B may be applied to the intermediate versions of the static resource obtained from applying its child transformation node 220A with the parameters represented by its child parameter nodes 230B and 230C as input parameters to further obtain a number of intermediate versions of the static resource. Note that the intermediate versions of the static resource resulted from apply the transformations represented by transformation node 220A may different from the intermediate versions of the static resource resulted from apply the transformations represented by transformation node 220B. Again, in particular embodiments, these specific intermediate versions of the static resource result from processing transformation node 220B and may be considered as being associated with transformation node 220B.

With respect to transformation node 220C, which is at a level immediately above transformation node 220B, it has one child parameter node 230B and one child transformation node 220B. The transformations represented by transformation node 220C may be applied to the intermediate versions of the static resource obtained from applying its child transformation node 220B with the parameters represented by its child parameter node 230B as input parameters to further obtain a number of intermediate versions of the static resource.

With respect to transformation node 220D, which is also at a level immediately above transformation node 220B, it has one child transformation node 220B but no child parameter node. Transformation node 220D may represent one or more transformations. Since transformation node 220D does not have any child parameter node, the transformations represented by transformation node 220D may be applied to the intermediate versions of the static resource obtained from applying its child transformation node 220B without any input parameter.

With respect to transformation node 220E, it has two child parameter nodes 230D and 230E but no child transformation node. Since transformation node 220E does not have any child transformation node, the transformations represented by transformation node 220E may be applied to the static resource with the parameters represented by its child parameter nodes 230D and 230E as input parameters to obtain a number of intermediate versions of the static resource.

With respect to transformation node 220F, it has three child transformation nodes 220C, 220D, and 220E but no child parameter node. There are a number of intermediate versions of the static resource obtained from processing transformation node 220C, a number of intermediate versions of the static resource obtained from processing transformation node 220D, and a number of intermediate versions of the static resource obtained from processing transformation node 220E, which may all be different from each other. In this case, since transformation node 220F does not have any child parameter node, the transformations repressed by transformation node 220F may be applied to all the intermediate versions of the static resource obtained from applying its three child transformation nodes 220C, 220D, and 220E without any input parameter.

With respect to transformation node 220G, it has one child parameter node 230F and one child transformation node 220F. The transformations represented by transformation node 220G may be applied to the intermediate versions of the static resource obtained from applying its child transformation node 220F with the parameters represented by its child parameter node 230F as input parameters to further obtain a number of intermediate versions of the static resource.

With respect to transformation node 220H, it has one child parameter node 230G and one child transformation node 220G. The transformations represented by transformation node 220H may be applied to the intermediate versions of the static resource obtained from applying its child transformation node 220G with the parameters represented by its child parameter node 230G as input parameters to further obtain a number of intermediate versions of the static resource. These specific intermediate versions of the static resource result from processing transformation node 220H and may be considered as being associated with transformation node 220H. At this point, the process has reached the final transformation node in graph 200 (i.e., transformation node 220H) at the second level (i.e., the level immediately below the first level where final-result node 210 is). The intermediate versions of the static resource obtained from processing transformation node 220H are in fact the final versions of the static resource resulted from applying graph 200 to the static resource.

As the above process illustrates, in particular embodiments, for a given graph applied to a given static resource, each transformation node is applied to the static resource in order, moving from the lowest level to the highest level of the graph, one level at a time, to produce intermediate versions of the static resource (except the last transformation node, which produces the final versions of the static resource). In particular embodiments, for each given transformation node, if the transformation node has one or more child parameter nodes, then the transformations represented by the transformation node are applied with all the parameters represented by its child parameter nodes as input parameters to the transformations. In particular embodiments, for each given transformation node, if the transformation node has one or more child transformation nodes, then the transformations represented by the transformation node are applied to all the intermediate versions of the static resource resulted from applying its child transformation nodes. Consequently, in particular embodiments, for each transformation node, the intermediate versions of the static resource resulted from applying the transformation node include all the combinations (i.e., the cross product) of the intermediate versions of the static resources resulted from applying its child parameter and transformation nodes. In particular embodiments, the final versions of each static resource may be stored in a database.

To further improve performance quality, particular embodiments may cache the value of a parameter represented by a parameter node, and the content of an intermediate or a final version of the static resource, as illustrated in STEP 130. Particular embodiments may apply a suitable hash algorithm to the value of a parameter represented by a parameter node to obtain a hash value for that parameter. Similarly, Particular embodiments may apply a suitable hash algorithm to the content of an intermediate or final version of the static resource to obtain a hash value for the content of that version of the static resource. Particular embodiments may store the parameter hash values and the version-content hash values in a database.

In particular embodiments, if multiple parameters have the same hash value, they may be considered the same parameter and merged into a single parameter, especially for caching purpose. In particular embodiments, if the contents of multiple versions of the static resource have the same hash value, they may be considered the same version of the static resource and merged into a single version, again, especially for caching purpose. This may help with decreasing the storage space needed to store the hash values, the versions of the static resources, and the graphs.

Figure 3:
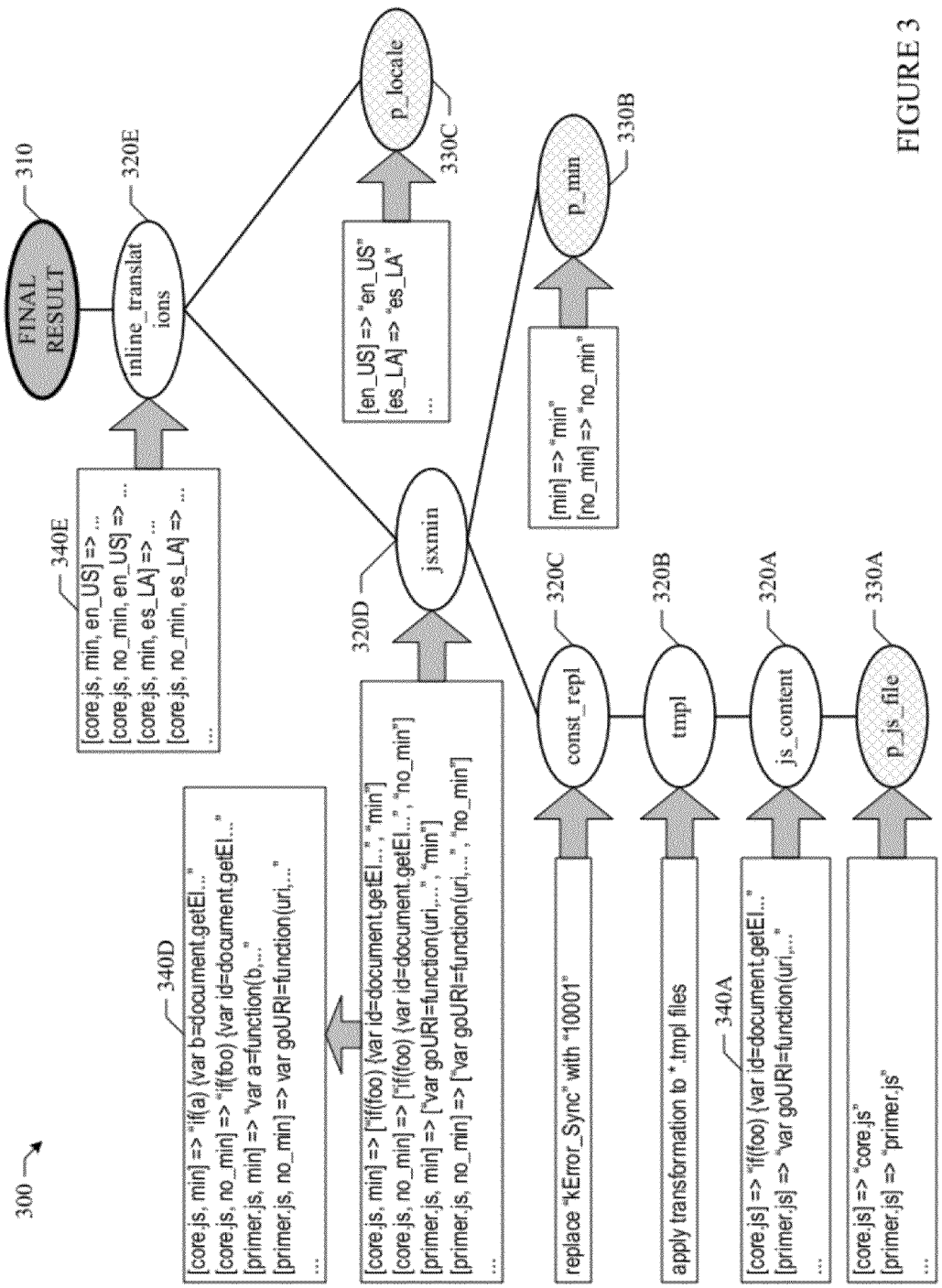
FIG. 3 illustrates an example graph that may be applied to static resources.
Figure 4:
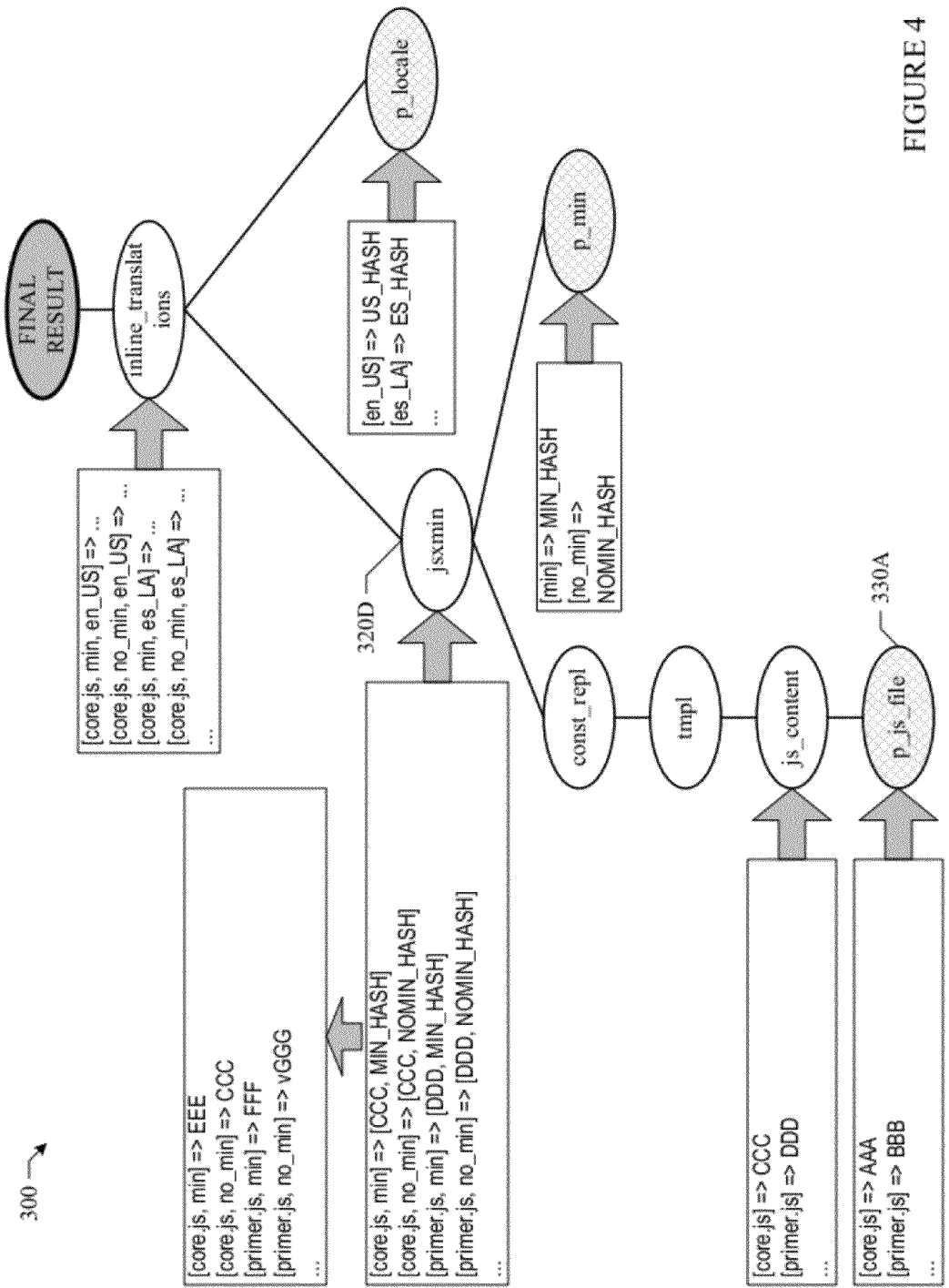
FIG. 4 illustrates an example graph that may be applied to static resources.

To further explain the steps illustrated in FIG. 1, the steps are applied to a practical example as illustrated in FIGS. 3 and 4. FIG. 3 illustrates an example graph 300 defined and constructed for JavaScript code based on the requirements of a specific web application. Graph 300 includes a final-result node 310 (i.e., the root node) at the first level, a number of transformation nodes 320, and a number of parameter nodes 330. Each parameter node 330 represents one or more parameters, and each transformation node 320 represents one or more transformations.

Starting from the lowest level, consider parameter node 330A, which represents a number of parameters, including, for example, [core.js]=>"core.js" and [primer.js]=>"primer.js". These parameters specify the individual files that contain the JavaScript code (e.g., "core.js" is the name of one JavaScript file while "primer.js" is name of another JavaScript file). In effect, graph 300 is to be applied to the JavaScript code included in these files specified by parameter node 330A to produce different versions of the JavaScript code.

Moving up one level, consider transformation node 320A, which represents specific transformations to be applied to the JavaScript code. Since parameter node 330A is a child node of transformation node 320A, the transformations represented by transformation node 320A are to be applied to the JavaScript code in the JavaScript files indicated by parameter node 330A (i.e., the parameters represented by parameter node 330A are used as input parameters, which specify in which files the JavaScript code is located, to the transformations represented by transformation node 320A). Applying the transformations represented by transformation node 320A to "core.js" results in one intermediate version of "core.js" as "if(foo) {var id=document.getEl . . . ". Applying the transformations represented by transformation node 320A to "primer.js" also results in one intermediate version of "primer.js" as "var goURI=function(uri, . . . ". Thus, there are intermediate versions 340A of the JavaScript code after applying the transformations represented by transformation node 320A to the JavaScript code specified by parameter node 330A. Versions 340A of the JavaScript code resulted from processing transformation node 320A and may be considered as being associated with transformation node 320A.

Moving up one level, consider transformation node 320B, which represents further transformations to be applied to intermediate versions 340A of the JavaScript code resulted from processing transformation node 320A, which is a child of transformation node 330B. Again, note that because transformation node 320A is a child of transformation node 320B, the transformations represented by transformation node 320B are applied to intermediate versions 340A of the JavaScript code, not directly to the original JavaScript code.

Moving up one level, consider transformation node 320C, which represents a further transformation to replace "kError_Sync" with the value "10001". Since transformation node 320B is a child of transformation node 320C, the transformation represented by transformation node 320C is applied to the intermediate results obtained from processing transformation node 320B.

Moving up one level, consider transformation node 320D, which represents one or more further transformations to the intermediate results obtained from processing transformation node 320C. Transformation node 320D has one child parameter node 330B and one child transformation node 320C. Parameter node 330B represents two parameters: [min]=>"min" and [no_min]=>"no_min". These two parameters are applied as input parameters when the transformations represented by transformation node 320D are applied to the intermediate results obtained from processing transformation node 320C.

As described above, in particular embodiments, the intermediate result obtained from processing each transformation node may include all combinations (i.e., the cross product) of the intermediate results obtained from processing the child transformation nodes and the parameters represented by the child parameter nodes. From transformation node 320C, the intermediate result includes a version of "core.js" and a version of "primer.js". From parameter node 330B, there are two parameters [min] and [no_min]. Thus, applying the two parameters to "core.js" results in two versions of "core.js", and similarly, applying the two parameters to "primer.js" results in two versions of "primer.js". Processing transformation node 320D results in intermediate versions 340D of "core.js" and "primer.js": [core.js, min], [core.js, no_min], [primer.js, min], and [primer.js, no_min]. Versions 340D of the JavaScript code resulted from processing transformation node 320D and may be considered as being associated with transformation node 320D.

Moving up one level, consider transformation node 320E, which again represents one or more further transformations to the intermediate results obtained from processing transformation node 320D. Transformation node 320E has one child parameter node 330C and one child transformation node 320D. Parameter node 330C represents two parameters: [en_US]=>"en_US" and [es_LA]=>"es_LA" (i.e., different language locales for the JavaScript code). These two parameters are applied as input parameters when the transformations represented by transformation node 320E are applied to the intermediate results 340D obtained from processing transformation node 320D. Processing transformation node 320E results in additional versions of "core.js" and "primer.js" 340E. For "core.js", there are four versions: [core.js, min, en_US], [core.js, no_min, en_US], [core.js, min, es_LA], and [core.js, no_min, es_LA]. For "primer.js", there are also four versions: [primer.js, min, en_US], [primer.js, no_min, en_US], [primer.js, min, es_LA], and [primer.js, no_min, es_LA].

Since transformation node 320E is the last transformation node immediately below final-result node 310, in this case, the versions of "core.js" and "primer.js" 340E obtained from processing transformation node 320E are the final versions of "core.js" and "primer.js".

As indicated above, particular embodiments may cache the values of the parameters represented by the parameter nodes and the contents of the intermediate or final versions of the static resources. FIG. 4 illustrates an example of caching some of the parameters and static-resource versions illustrated in FIG. 3. For example, parameter node 330A includes two parameters [core.js] and [primer.js]. A suitable hashing algorithm may be used to compute a hash value for the value of [core.js] (i.e., "core.js") as well as for the value of [primer.js] (i.e., "primer.js"). Suppose that the hash value for "core.js" is AAA (e.g., by applying a suitable hash algorithm to "core.js"), and the hash value for "primer.js" is BBB (e.g., by applying a suitable hash algorithm to "primer.js"). These two hash values may then be stored and cached. As another example, from processing transformation node 320D, "core.js" and "primer.js" each have two intermediate versions. For "core.js", the two versions are [core.js, min] and [core.js, no_min]. The content of [core.js, min] is "if(a) {var b=document.getEl . . . ". A hash value (e.g., EEE) may be computed for this content (e.g., by applying a suitable hash algorithm to "if(a) {var b=document.getEl . . . ") as the hash value for [core.js, min]. The content of [core.js, no_min] is "if(foo) {var id=document.getEI . . . ". A hash value (e.g., CCC) may be computed for this content (e.g., by applying a suitable hash algorithm to "if(foo) {var id=document.getEI . . . ") as the hash value for [core.js, no_min].

In other words, in particular embodiments, to cache a parameter, a hashing algorithm may be applied to the value of that parameter to compute a hash value for the parameter. To cache a version (either intermediate or final) of a static resource, a hashing algorithm may be applied to the content of that version of the static resource to compute a hash value for the version of the static resource. Consequently, each parameter may have a corresponding hash value and each version of the static resource may have a corresponding hash value. The hash values of the parameters and of the versions of the static resources may be stored and cached.

In particular embodiments, if multiple parameters have the same hash value, this suggests that these parameters have the same value. Similarly, if multiple versions of a static resource has the same hash value, this suggests that these versions of the static resource have the same content. For example, in FIG. 3, if transformation node 330C also includes a third locale [en_UK], then applying this parameter to "core.js" may result in a version of "core.js" that has the same content as the version with [en_US], as both countries speak English. As a result, both versions may have the same hash value as the same content is used to compute the two hash values for the two versions. In particular embodiments, if multiple versions of a static resource have the same hash value and thus the same content, they may be merged as a single version.

In particular embodiments, the different versions of a static resource may be determined ahead of the time they are needed or determined on the fly as they are needed, using, for example, the process illustrated in FIG. 1. In particular embodiments, if the versions of a static resource have been determined ahead of time, when a particular version of the static resource is needed by, for example, a client, the corresponding hash value of that particular version of the static resource may be used as a means to lookup the actual content of that particular version of the static resource. In particular embodiments, the hash value of a version of a static resource may be provided to a client as a URL (Uniform Resource Locator). For example, for a version of a CSS code, such a URL may take the form of "rsrc.php/yn/r/tLQ9rqPvIAC.css". In this example, "tLQ9rqPvIAC" is the hash value of the content of the version of the CSS code, which may be used to lookup and retrieve the actual content of the version of the CSS code.

Predetermining the versions of static resources and serving URLs corresponding to the individual versions of static resources (e.g., "rsrc.php/yn/r/tLQ9rqPvIAC.css") to clients provide the advantage of having an infinite cache lifetime, which improves caching on the browsers, because the contents of the versions of static resources cannot change without their corresponding hash values changing.

On the other hand, if the versions of a static resource are to be determined on the fly, at the time when a particular version of the static resource is actually needed by, for example, a client, then a different (e.g., special on-the-fly) URL may be provided to the client, which may be used to determine the particular version of the static resource on the fly. For example, for a version of a CSS code, such a URL may take the form of "rsrc.php/yN/r/sqUREQ6G0w2/css/base.css?p_cdn=0&p_crush=no_crush&p_css_browser=ff&p_fontsize=0&p_rtl=ltr&p_secure=http". This URL may cause the particular version of the static resource needed by the client to be determined on the fly. In this example, "css/base.css" is a parameter value for the path parameter (e.g., a package name); "sqUREQ6G0w2" is a hash value of the content of a cache breaker placed in the URL, causing browser cache to be broken when necessary; and the values of the parameters "p_cdn=0&p_crush=no_crush&p_css_browser=ff&p_fontsize=0&p_rtl=ltr&p_secure=http" are provided by, for example, a website or a system that determines the versions of the static resources.

Determining the versions of static resources on the fly using URLs such as "rsrc.php/yN/r/sqUREQ6G0w2/css/base.css?p_cdn=0&p_crush=no_crush&p_css_browser=ff&p_fontsize=0&p_rtl=ltr&p_secure=http" may have a problem in that the underlying content of the file "base.css" may change at any time, or that the values of the parameters or the logic of the transformations or the graph itself may change at any time. When such a change occurs, in particular embodiments, the cache-life time should be set to zero. However, particular embodiments may get around this by introducing a "cache breaker" in each URL, which tries to encompass all these dependencies. In particular embodiments, the cache breaker may contain the last modified time of the file, the last time translations were updated, a global graph version, etc. By taking all these values and hashing them (e.g., "sqUREQ6G0w2" as the hash value obtained by hashing the content of the cache breaker) and placing the hash value of the cache breaker in the on-the-fly URLs provided to the clients, particular embodiments may guarantee that whenever the file (e.g., "base.css") changes, or the translations change, or the graph is updated in some way, any new on-the-fly URLs will have an updated cache breaker allowing the browser cache to be broken as necessary. Using a cache breaker thus avoid requiring developers to run a script to pre-compute the versions of static resources, and at the same time, guarantees a near optimal caching experience.

In particular embodiments, the process illustrated in FIG. 1 may be used in connection with a social-networking website. A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. Such social-networking websites enable their members, who are commonly referred to as website users, to perform various social activities. For example, the social-networking website operated by Facebook, Inc. at www.facebook.com enables its users to communicate with their friends via emails, instant messages, or blog postings, organize social events, share photos, receive news of their friends or interesting events, play games, etc. The process illustrated in FIG. 1 may be used for pre-processing static resources used by a social-networking website. Alternatively, the social-networking website may choose to process the static resources dynamically (i.e., on the fly as each static resource is needed).

Figure 5:
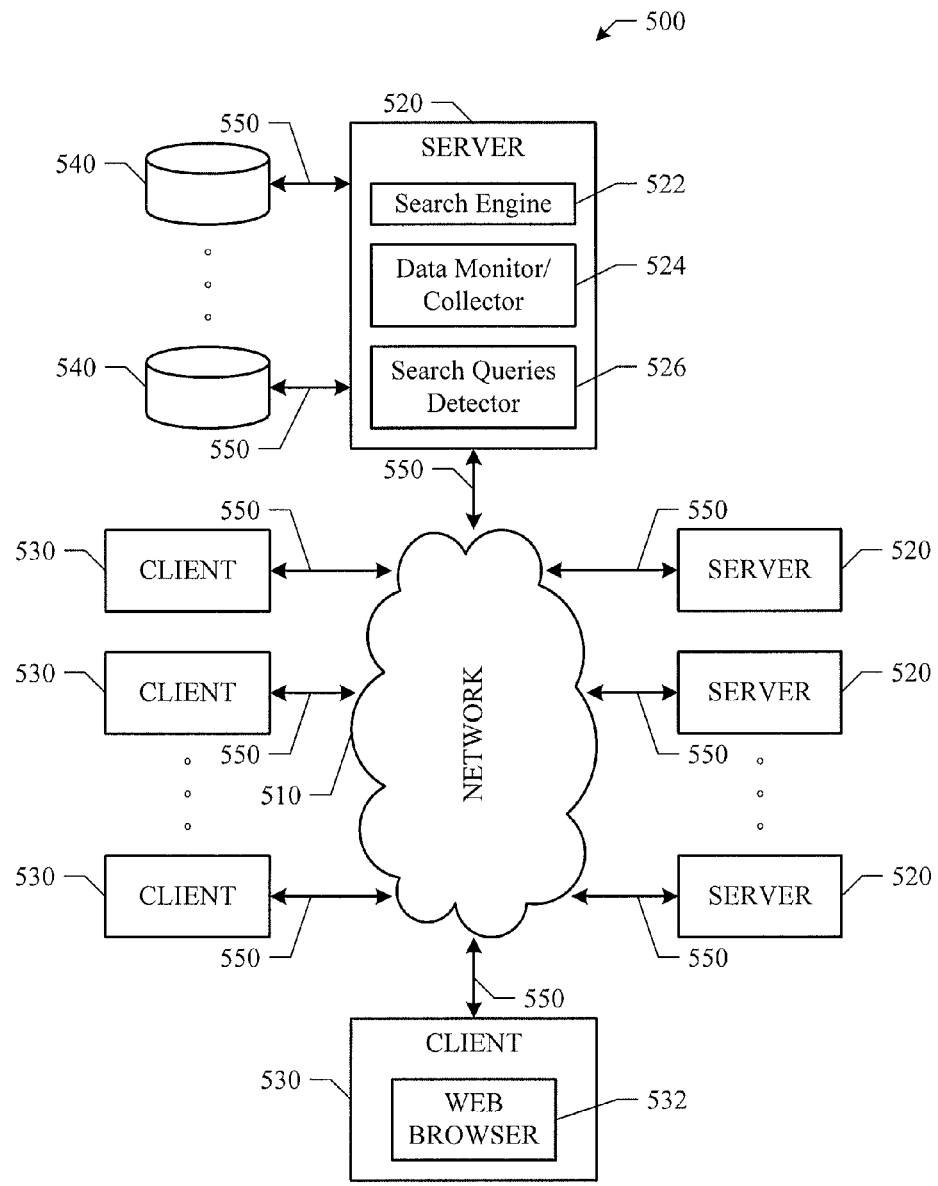
FIG. 5 illustrates an example network environment.

Particular embodiments may be implemented in a network environment. FIG. 5 illustrates an example network environment 500 suitable for providing software validation as a service. Network environment 500 includes a network 510 coupling one or more servers 520 and one or more clients 530 to each other. In particular embodiments, network 510 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 510. The present disclosure contemplates any suitable network 510.

One or more links 550 couple a server 520 or a client 530 to network 510. In particular embodiments, one or more links 550 each includes one or more wireline, wireless, or optical links 550. In particular embodiments, one or more links 550 each includes an intranet, an extranet, a VPN, a LAN, a WLAN, a WAN, a MAN, a portion of the Internet, or another link 550 or a combination of two or more such links 550. The present disclosure contemplates any suitable links 550 coupling servers 520 and clients 530 to network 510.

In particular embodiments, each server 520 may be a unitary server or may be a distributed server spanning multiple computers or multiple datacenters. Servers 520 may be of various types, such as, for example and without limitation, web server, news server, mail server, message server, advertising server, file server, application server, exchange server, database server, or proxy server. In particular embodiments, each server 520 may include hardware, software, or embedded logic components or a combination of two or more such components for carrying out the appropriate functionalities implemented or supported by server 520. For example, a web server is generally capable of hosting websites containing web pages or particular elements of web pages. More specifically, a web server may host HTML files or other file types, or may dynamically create or constitute files upon a request, and communicate them to clients 530 in response to HTTP or other requests from clients 530. A mail server is generally capable of providing electronic mail services to various clients 530. A database server is generally capable of providing an interface for managing data stored in one or more data stores.

In particular embodiments, one or more data storages 540 may be communicatively linked to one or more severs 520 via one or more links 550. In particular embodiments, data storages 540 may be used to store various types of information. In particular embodiments, the information stored in data storages 540 may be organized according to specific data structures. In particular embodiment, each data storage 540 may be a relational database. Particular embodiments may provide interfaces that enable servers 520 or clients 530 to manage, e.g., retrieve, modify, add, or delete, the information stored in data storage 540.

In particular embodiments, each client 530 may be an electronic device including hardware, software, or embedded logic components or a combination of two or more such components and capable of carrying out the appropriate functionalities implemented or supported by client 530. For example and without limitation, a client 530 may be a desktop computer system, a notebook computer system, a netbook computer system, a handheld electronic device, or a mobile telephone. The present disclosure contemplates any suitable clients 530. A client 530 may enable a network user at client 530 to access network 530. A client 530 may enable its user to communicate with other users at other clients 530.

A client 530 may have a web browser 532, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 530 may enter a Uniform Resource Locator (URL) or other address directing the web browser 532 to a server 520, and the web browser 532 may generate a Hyper Text Transfer Protocol (HTTP) request and communicate the HTTP request to server 520. Server 520 may accept the HTTP request and communicate to client 530 one or more Hyper Text Markup Language (HTML) files responsive to the HTTP request. Client 530 may render a web page based on the HTML files from server 520 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 6:
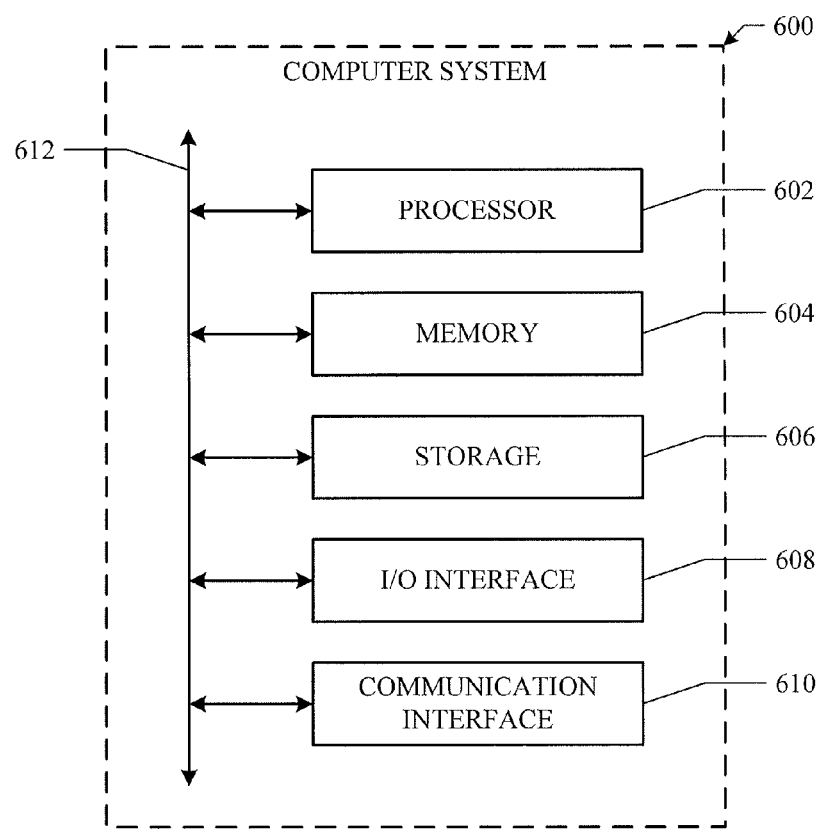
FIG. 6 illustrates an example computer system.

Particular embodiments may be implemented on one or more computer systems. FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. The present disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. The present disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in HyperText Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
constructing, by one or more computing devices, a graph comprising one or more parameter nodes and one or more transformation nodes, wherein:
each parameter node represents one or more parameters; and
each transformation node represents one or more transformations, each transformation resulting in one or more intermediate versions of a static resource, the static resource comprising code for generating one or more dynamic web pages; and
sequentially applying, by the one or more computing devices, from a lowest level to a highest level of the graph, the one or more parameters represented by each parameter node and the one or more transformations represented by each transformation node to a static resource to determine one or more versions of the static resource associated with each transformation node, wherein determining each of the one or more versions of the static resource comprises:
if the transformation node has one or more child transformation nodes, then applying the one or more transformations represented by the transformation node to one or more versions of the static resource resulting from and associated with the one or more child transformation nodes.

2. The method of claim 1, further comprising caching each parameter represented by each parameter node.

3. The method of claim 2, wherein caching each parameter represented by each parameter node comprises computing and storing a hash value for each parameter represented by each parameter node.

4. The method of claim 1, wherein the determining each of the one or more versions of the static resource comprises:
if the transformation node has one or more child parameter nodes, then applying the one or more transformations represented by the transformation node to the static resource in connection with the one or more parameters represented by the one or more child parameter nodes.

5. The method of claim 1, further comprising caching each intermediate version of the static resource determined at each level of the graph.

6. The method of claim 5, wherein caching each intermediate version of the static resource comprises computing and storing a hash value for each intermediate version of the static resource.

7. The method of claim 5, farther comprising merging one or more of the intermediate versions of the static resource if the intermediate versions of the static resource have a same hash value.

8. The method of claim 1, wherein
the versions of the static resource are determined when the versions of the static resource are needed; and
determining a version of the static resource when he version of the static resource is needed comprises determining a Uniform Resource Locator (URL) that causes the version of the static resource to be determined by applying the graph, wherein the URL comprises a cache-breaker hash value that causes a browser to break its cache if the graph has been modified.

9. A system comprising:
a memory comprising instructions executable by one or more processors; and
the one or more processors coupled to the memory and operable to execute the instructions, the one or more processors being operable when executing the instructions to:
construct a graph comprising one or more parameter nodes and one or more transformation nodes, wherein:
each parameter node represents one or more parameters; and
each transformation node represents one or more transformations, each transformation resulting in one or more intermediate versions of a static resource, the static resource comprising code for generating one or more dynamic web pages; and
sequentially apply, from a lowest level to a highest level of the graph, the one or more parameters represented by each parameter node and the one or more transformations represented by each transformation node to a static resource to determine one or more versions of the static resource associated with each transformation node, wherein each of the one or more versions of the static resource comprises:
if the transformation node has one or more child transformation nodes, then apply the one or more transformations represented by the transformation node to one or more versions of the static resource resulting from and associated with the one or more child transformation nodes.

10. The system of claim 9, wherein the processors are further operable when executing the instructions to cache each parameter represented by each parameter node.

11. The system of claim 10, wherein caching each parameter represented by each parameter node comprises computing and storing a hash value for each parameter represented by each parameter node.

12. The system of claim 9, wherein the determining each of the one or more versions of the static resource comprises:
if the transformation node has one or more child parameter nodes, then apply the one or more transformations represented by the transformation node to the static resource in connection with the one or more parameters represented by the one or more child parameter nodes.

13. The system of claim 9, wherein the processors are further operable when executing the instructions to cache each intermediate version of the static resource determined at each level of the graph.

14. The system of claim 13, wherein caching each intermediate version of the static resource comprises computing and storing a hash value for each intermediate version of the static resource.

15. The system of claim 13, wherein the one or more processors are further operable when executing the instructions to merge one or more intermediate versions of the static resource determined at one or more levels of the graph if the one or more intermediate versions of the static resource have a same hash value.

16. The system of claim 9, wherein
the one or more versions of the static resource are determined when the one or more versions of the static resource are needed; and
determining a version of the static resource when the version of the static resource is needed comprises determining a Uniform Resource Locator (URL) that causes the version of the static resource to be determined by applying the graph, wherein the URL comprises a cache-breaker hash value that causes a browser to break its cache if the graph has been modified.

17. One or more computer-readable non-transitory storage media embodying software operable when executed by one or more computer systems to:
construct a graph comprising one or more parameter nodes and one or more transformation nodes, wherein:
each parameter node represents one or more parameters; and
each transformation node represents one or more transformations, each transformation resulting in one or more intermediate versions of a static resource, the static resource comprising code for generating one or more dynamic web pages; and
sequentially applying, by the one or more computing devices, from a lowest level to a highest level of the graph, the one or more parameters represented by each parameter node and the one or more transformations represented by each transformation node to a static resource to determine one or more versions of the static resource associated with each transformation node, wherein determining each of the one or more versions of the static resource comprises:
if the transformation node has one or more child transformation nodes, then applying the one or more transformations represented by the transformation node to one or more versions of the static resource resulting from and associated with the one or more child transformation nodes.

18. The media of claim 17, wherein the determining each of the one or more versions of the static resource comprises:
if the transformation node has one or more child parameter nodes, then apply the one or more transformations represented by the transformation node to the static resource in connection with the one or more parameters represented by the one or more child parameter nodes.

19. The media of claim 17, wherein the software is further operable when executed by the computer systems to cache each intermediate version of the static resource determined at each level of the graph.

20. The media of claim 17, wherein
the one or more versions of the static resource are determined when the one or more versions of the static resource are needed; and
determining a version of the static resource when the version of the static resource is needed comprises determining a Uniform Resource Locator (URL) that causes the version of the static resource to be determined by applying the graph, wherein the URL, comprises a cache-breaker hash value that causes a browser to break its cache if the graph has been modified.

* * * * *